United States Patent Office 3,527,703
Patented Sept. 8, 1970

3,527,703
POLYCHLOROETHYLENE STABILIZED BY METALLIC BENZOATES
Wesley L. Archer, Midland, Mich., and Miriam K. Harter, Miami, Fla., assignors to The Dow Chemical Company, Midland, Mich., a corporation of Delaware
No Drawing. Filed Dec. 28, 1967, Ser. No. 694,077
Int. Cl. C09k 3/00; C23f 11/00
U.S. Cl. 252—153
3 Claims

ABSTRACT OF THE DISCLOSURE

The corrosion of iron in the presence of wet trichloroethylene or wet tetrachloroethylene is inhibited by the presence in the solvent of a small amount of any of certain metal benzoates.

BACKGROUND OF THE INVENTION

Polychloroethylenes such as trichloroethylene and tetrachloroethylene are commonly used as solvents in various cleaning operations, particularly in metal degreasing. Since these unsaturated chlorinated solvents are subject to some extent to oxidative attack and to slow reaction in the presence of certain metals or impurities such as metal salts and moisture, thereby forming acidic or colored byproducts, additives such as antioxidants and acid scavengers are customarily incorporated to inhibit these degradative and corrosive changes. However, in operations such as metal degreasing, gross amounts of water sufficient to form a second liquid phase often accumulate in the solvent. In the presence of such quantities of water, conventional inhibitors tend to lose their effectiveness and there may be rapid and extensive corrosion of steel containers and degreasing apparatus.

SUMMARY OF THE INVENTION

It has now been found that certain metal salts of benzoic acid are capable of preventing or considerably diminishing the corrosion of iron by wet trichloroethylene and tetrachloroethylene when incorporated in these solvents in very small amounts. The benzoates of bimuth, cerium, chromium, dysprosium, erbium, iron, holmium, indium, lutetium sodium, neodymium, nickel, lead, praseodymium, samarium, tin, (stannic), thorium, thulium, yttrium, zinc, and zirconium as well as ammonium benzoate have been found effective for the purpose. Mixtures of two or more of the listed benzoates are similarly effective. Surprisingly, although some of these benzoates also inhibit the corrosion of iron by wet saturated chlorinated solvents most of the listed salts are effective inhibitors only in the unsaturated chlorinated solvents described above. Similarly, metal benzoates other than those named are not effective inhibitors in wet trichloroethylene or tetrachloroethylene.

DETAILED DESCRIPTION

There is no critical minimum concentration of metal benzoate inhibitor since any significant quantity will provide some protection. Concentrations of 0.1–5000 parts by weight of benzoate per million parts of solvent may be used and a quantity at least sufficient to saturate the organic solvent is conveniently employed.

The terms wet trichloroethylene and wet tetrachloroethylene are used in this specification to mean those solvents contaminated with enough water to form a separate aqueous phase so that the solvent composition actually wets contacting surfaces with a film of water. Significantly more than a saturating quantity of water is present, therefore, for example, up to 10–25 percent by weight of water.

These metal benzoates are normally employed in combination with known antioxidants, acid scavengers, and other such conventional inhibitors in the polychloroethylene solvent composition. The metal benzoate inhibitors of this invention also serve to prevent or diminish the depletion of these conventional inhibitors during the use of the solvent composition.

Benzoates in which the metal is in a stable (usually higher valence) state are preferred inhibitors.

The present metal benzoates are particularly effective inhibitors in the liquid phase at temperatures normally encountered in cleaning and degreasing processes.

In the following illustrative examples, 50 ml. compositions were prepared consisting of 0.5 percent by volume of water, a saturating quantity of metal benzoate, and the remainder a commercial grade of inhibited trichloroethylene or tetrachloroethylene. A polished iron nail (AISI–SAE No. 1025 steel with about 0.25 percent carbon) 2.5 inches long and ⅛ inch in diameter was added to each sample in a four ounce test bottle. The bottles were tightly capped to prevent evaporation. The sample bottles were such that about one third to one half of the length of the nail extend above the surface of the solvent. The samples were then maintained at about 55–60° C. in an oven for seven days. Control bottles containing nails and the same solvent compositions but without metal benzoate inhibitor were subjected to the same procedure. After seven days, the samples were examined and the extent of iron corrosion in the liquid phase was rated in each case according to the following system.

| Rating symbol: | Explanation |
| --- | --- |
| 0 | No corrosion inhibition, nail covered with a heavy crust of corrosion products |
| 1 | Some corrosion inhibition, some areas of nail remained clean, colored film may have formed |
| 2 | Good inhibition, nail surface remained clean with occasional few spots of discoloration |

Results of these tests are summarized in the following table. The solvents employed were commercial grades containing an amine-epoxide inhibitor system in the case of trichloroethylene and an organic nitrogen-based inhibitor system in the case of tetrachloroethylene. The concentrations listed represent approximately those of saturated solutions. In some cases, not all of the added benzoate salt dissolved, in which case the concentration is given as less than the quantity added. Valences of the metal ions are expressed in Roman numerals.

| Example No. | Benzoate of— | Trichloroethylene | | Tetrachloroethylene | |
|---|---|---|---|---|---|
| | | Benzoate conc., p.p.m. | Rating | Benzoate conc., p.p.m. | Rating |
| 1 | Ammonium (I) | Sat'd | 2 | 5 | 2 |
| 2 | Bismuth (III) | <1 | 2 | <1 | 2 |
| 3 | Cerium (III) | <130 | 1 | <130 | 2 |
| 4 | Chromium (III) | 25 | 2 | 4 | 2 |
| 5 | Dysprosium (III) | 800 | 2 | <15 | 2 |
| 6 | Erbium (III) | <10 | 1 | <10 | 2 |
| 7 | Iron (III) | 210 | 2 | 150 | 2 |
| 8 | Holmium (III) | 130 | 2 | <13 | 2 |
| 9 | Indium (III) | 30 | 2 | <8 | 2 |
| 10 | Lutetium (III) | 20 | 1 | <10 | 1 |
| 11 | Sodium (I) | 0.4 | 2 | 0.3 | 2 |
| 12 | Neodymium (III) | 100 | 2 | <75 | 2 |
| 13 | Nickel (II) | <0.5 | 1 | 0.5 | 2 |
| 14 | Lead (II) | 20 | 2 | 3.7 | 2 |
| 15 | Praseodymium (III) | <100 | 2 | <100 | 2 |
| 16 | Samarium (III) | 140 | 2 | <59 | 2 |
| 17 | Tin (IV) | <1 | 2 | <1 | 2 |
| 18 | Thorium (III) | 550 | 2 | 38 | 2 |
| 19 | Thulium (III) | 18 | 1 | <10 | 1 |
| 20 | Yttrium (III) | 30 | 2 | <3 | 2 |
| 21 | Zinc (II) | 560 | 2 | 60 | 2 |
| 22 | Zirconium (IV) | 45 | 1 | 46 | 2 |
| 23 | No benzoate additive | | 0 | | 0 |

Wet trichloroethylene and wet tetrachloroethylene containing no inhibitor other than a metal benzoate as listed above are found to be similarly stabilized against corrosion of iron under the test conditions.

We claim:

1. Polychloroethylene inhibited against corrosion of iron in the presence of water by having dissolved in said polychloroethylene a small but inhibiting amount of at least one of the benzoate salts of ammonium, bismuth, cerium, chromium, dysprosium, erbium, iron, holmium, indium, lutetium, sodium, neodymium, nickel, lead, praseodymium, samarium, stannic tin, thorium, thulium, yttrium, zinc, and zirconium, wherein the polychloroethylene is trichloroethylene or tetrachloroethylene.

2. The inhibited polychloroethylene of claim 1 wherein the polychloroethylene is trichloroethylene.

3. The inhibited polychloroethylene of claim 1 wherein the polychloroethylene is tetrachloroethylene.

References Cited

UNITED STATES PATENTS 3,449,262  6/1969  Archer et al. ---- 260—652.5 X

JOHN T. GOOLKASIAN, Primary Examiner

M. E. McCAMISH, Assistant Examiner

U.S. Cl. X.R.

252—171, 172, 396, 407; 260—515, 652.5